Jan. 5, 1943.                P. OOTON                2,307,709
                             BACK REST
                         Filed Oct. 18, 1940         2 Sheets-Sheet 1
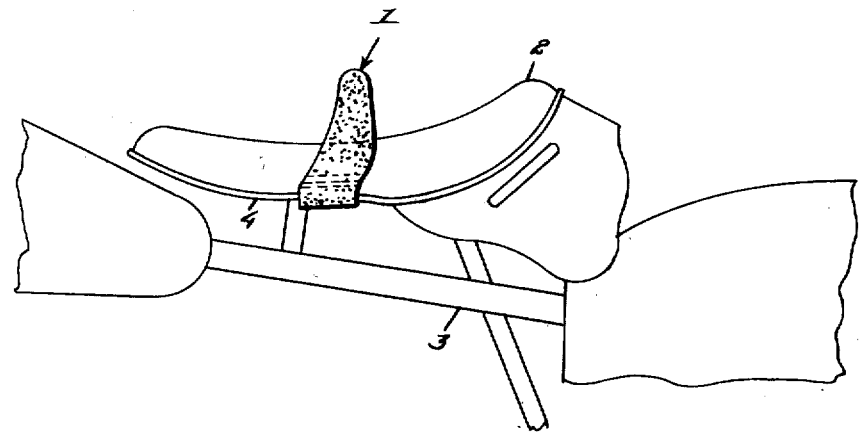
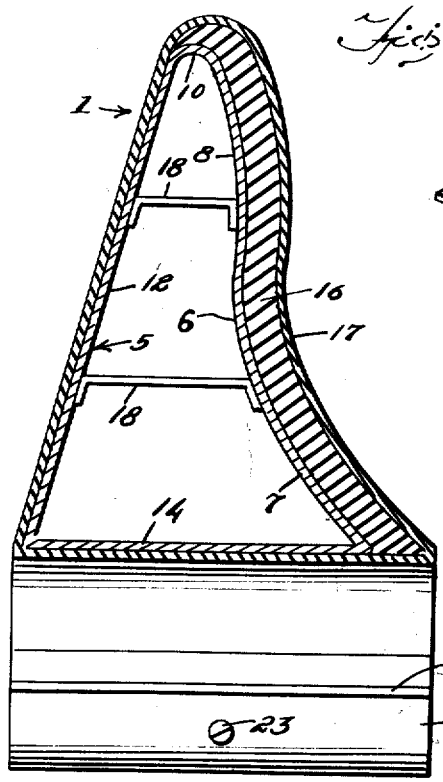
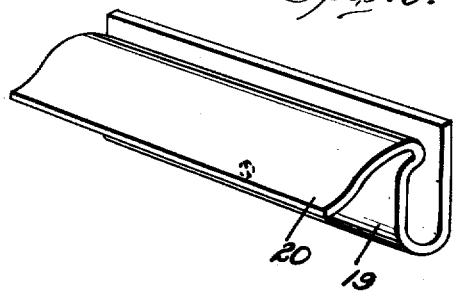
Inventor
Paige Ooton
By Clarence A. O'Brien
Attorney Jan. 5, 1943.　　　　　P. OOTON　　　　　2,307,709
BACK REST
Filed Oct. 18, 1940　　　2 Sheets-Sheet 2
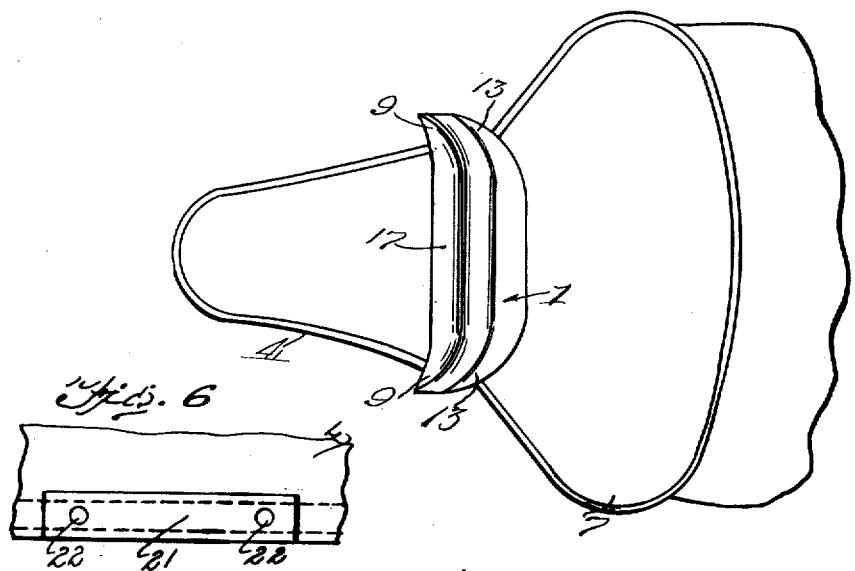
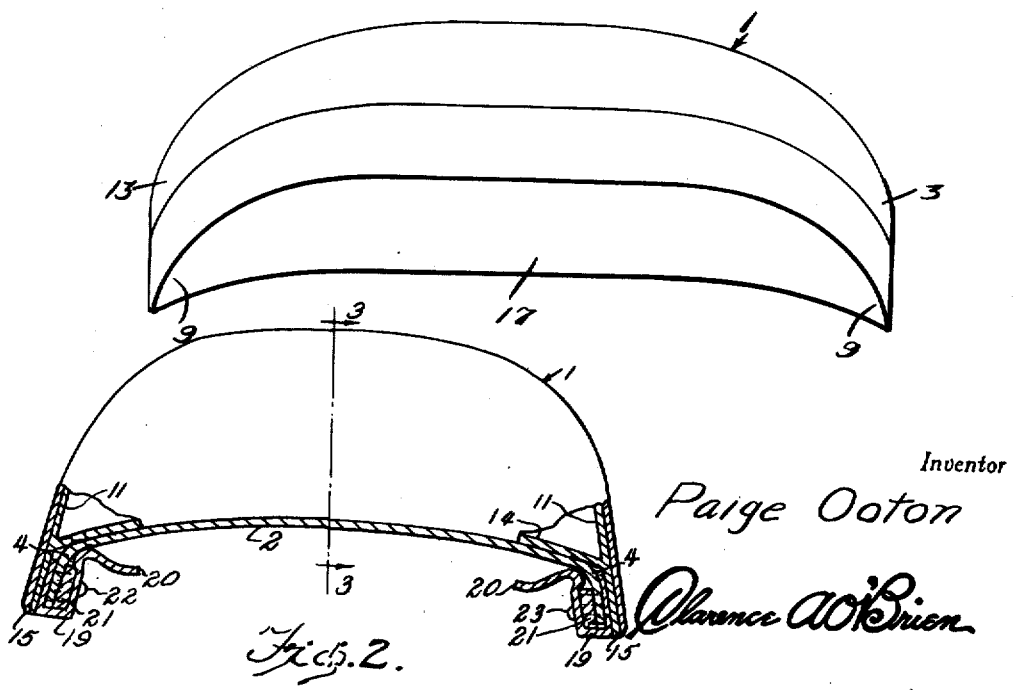
Inventor
Paige Ooton
Clarence A. O'Brien
Attorney Patented Jan. 5, 1943

2,307,709

UNITED STATES PATENT OFFICE 2,307,709

BACK REST

Paige Ooton, Hopkinsville, Ky.

Application October 18, 1940, Serial No. 361,777

1 Claim. (Cl. 155—5.6)

My invention relates to improvements in back rests for motorcycle seats or the like.

The principal object of my invention is to provide a comfortable, inexpensive, back rest which may be easily attached to and detached from the usual large size, so-called "Buddy" seat for two, of a motorcycle to divide the same so that one may ride "solo" on the front part of the seat without sliding back thereon under operation of the cycle.

Another object in view is to provide such a rest and which may also be used when two are riding the seat to prevent the front rider from crowding the rear rider, and vice versa.

Other, and subordinate, objects are also comprehended by my invention, all of which, together with the precise nature of my improvements, will be readily understood when the succeeding description and claim are read with reference to the drawings accompanying and forming part of this specification.

In said drawings:

Figure 1 is a view in side elevation of the preferred embodiment of my invention applied, Figure 2 is a view partly in front elevation and partly in section of the rest detached, and drawn to an enlarged scale, Figure 3 is a view in transverse section taken on the line 3—3 of Figure 2, Figure 4 is a view in top plan of the rest, Figure 5 is a view in perspective of one of the back rest attaching clips.

Figure 6 is a fragmentary view in elevation of one of the side flanges of the seat and the reinforcing strip therefor.

Figure 7 is a view in top plan.

Referring to the drawings by numerals, I have shown my improved back rest 1 as applied to the usual double, or large size "Buddy" seat 2 of a motorcycle represented, in part, at 3. Such seats, as is well known, increase in width rearwardly with an abrupt increase in width in the approximate transverse center thereof and are provided with downturned side edges 4.

The back rest 1 comprises a hollow metal core 5 having a front wall 6 of compound curvature in cross section so as to form a concave lower portion 7 and a convex upper portion 8, said wall curving forwardly, as at 9, at the sides of the core all so as to contribute to the comfort of the lower back of a rider on the front half of the seat. The core 5 has a top which is rounded, as at 10, and merges into downwardly curving and flaring sides of the core as indicated at 11. The back 12 of the core is preferably flat transversely, but inclined downwardly and rearwardly to brace the structure, and curves forwardly at the ends, as at 13, out of interference with a rider on the rear half of the seat 2. The bottom 14 of the core 5 is arched transversely to conform substantially to the usual cross sectional arch of the seat 2. As best shown in Figures 1 and 2, the sides 11 of the core extend below the bottom 14 so as to form downwardly flaring side flanges 15 on the core adapted to straddle the seat 2 about midway thereof.

The front wall of the core 5 and the top 10 are cushioned by a thick pad of sponge rubber 16. The core 5 and pad 16 are enclosed by a covering 17 of leather. Transverse upper and lower braces 18 of any suitable character may be provided in the core 5.

A pair of attaching clips 19 of channel form and resilient material are suitably secured by one side thereof to the inner faces of the flanges 15 to extend along the same, said clips having free lateral edge flanges 20 extending along the other sides thereof for downward and outward flexing to open up the clips. As will be understood, the clips 19 are designed for straddling the side edges 4 to attach the rest thereto. Reinforcing strips 21 of any suitable material, such as leather, are secured, as by rivets 22, to the inner faces of the side edges 4 of the seat 2 in the approximate center of the seat, and which are designed to also be straddled by the clips 19, said clips frictionally engaging said edges 4 and the strips 21 to yieldingly hold the rest in position.

The described rest 1 is applied by shoving the same rearwardly along the front part of the seat 2 to the approximate center of the latter, the clips 19 being opened by manipulation of the flanges 20 thereof to grip the edges 4 of the seat 2 in the manner already described.

Screws 23 may be extended through the clips 19 and edges 4 if desired to permanently attach the rest to the seat.

The foregoing will, it is believed, suffice to impart a clear understanding of my invention without further explanation.

Manifestly the invention, as described, is susceptible of modification without departing from the inventive concept, and right is herein reserved to such modifications as fall within the scope of the subjoined claim.

What I claim is:

A rest for a cycle seat of the type having depending side edges, said rest comprising a hollow metal core having a front wall of compound curvature in vertical section to provide a lower concave portion and an upper convex portion to be opposed to the lower back of a rider, said front wall having side edges curving forwardly to further fit the back of a rider, a cushion pad of sponge rubber covering said front wall, a covering enclosing said core and pad, and means to secure said core to said side edges of the seat to extend transversely across the same, said means including depending flanges on the sides of said core adapted to extend alongside said edges and resilient clips on said flanges for clamping said edges.

PAIGE OOTON.